March 26, 1940.　　G. W. HOWLETT　　2,194,702
APPARATUS FOR MAKING DECORATIVELY COVERED HEELS.
Filed March 3, 1939　　5 Sheets-Sheet 2

Inventor:
GRAYLE W. HOWLETT
By Lee J. Fans
Attorney.

Inventor:
Grayle W. Howlett
By Lee J. Gary
Attorney.

March 26, 1940. G. W. HOWLETT 2,194,702
APPARATUS FOR MAKING DECORATIVELY COVERED HEELS
Filed March 3, 1939 5 Sheets-Sheet 5

Inventor:
GRAYLE W. HOWLETT
By Lee J. Gary
Attorney

Patented Mar. 26, 1940

2,194,702

UNITED STATES PATENT OFFICE 2,194,702

APPARATUS FOR MAKING DECORATIVELY COVERED HEELS

Grayle W. Howlett, Evanston, Ill.

Application March 3, 1939, Serial No. 259,540

11 Claims. (Cl. 91—16)

This is a continuation in part of my co-pending application Serial No. 84,429, filed June 10, 1936, now matured into Patent No. 2,149,293, issued on March 7, 1939, and relates to improvements in means for decorating irregular shaped objects, and refers specifically to means for decorating heels as a continuous operation.

The objects and advantages of my invention will be apparent from the accompanying drawings and following detailed description.

Referring in detail to the drawings, 1, 1 indicate legs or supports for oppositely disposed longitudinally extending frame members 2 and 3. The frame members 2 and 3 are spaced by end supports 4 and 5. A shaft 6 is journalled at each of its ends in the frame members 2 and 3 adjacent one end of the machine. A shaft 7 is similarly journalled at the opposite end thereof. A pair of sprocket wheels 8 are mounted upon shaft 6 and a corresponding pair of sprocket wheels 9 are mounted upon shaft 7. Sprocket wheel 10 is also mounted upon one end of shaft 7 and is driven by sprocket chain 11 which is trained around sprocket pinion 12 mounted upon shaft 13 of a conventional speed reducing mechanism 14. The input to the speed reducing mechanism comprises a pulley 15 which is driven by means of a belt 16, the belt in turn being driven by pulley 17 mounted on the armature shaft of motor 18.

Sprocket chains 19, 19 travel around both pairs of sprocket wheels 8 and 9 in a continuous or endless fashion. A plurality of bars 20 are secured to the chains 19, said bars transversely spanning the space between said chains. The bars 20 are spaced from each other along the length of chains 19, the degree of said spacing being determined, as will be hereinafter more fully described, by the length of the mechanism which resiliently forces the heels to be coated into contact with the mold or die.

Figures 3, 4:
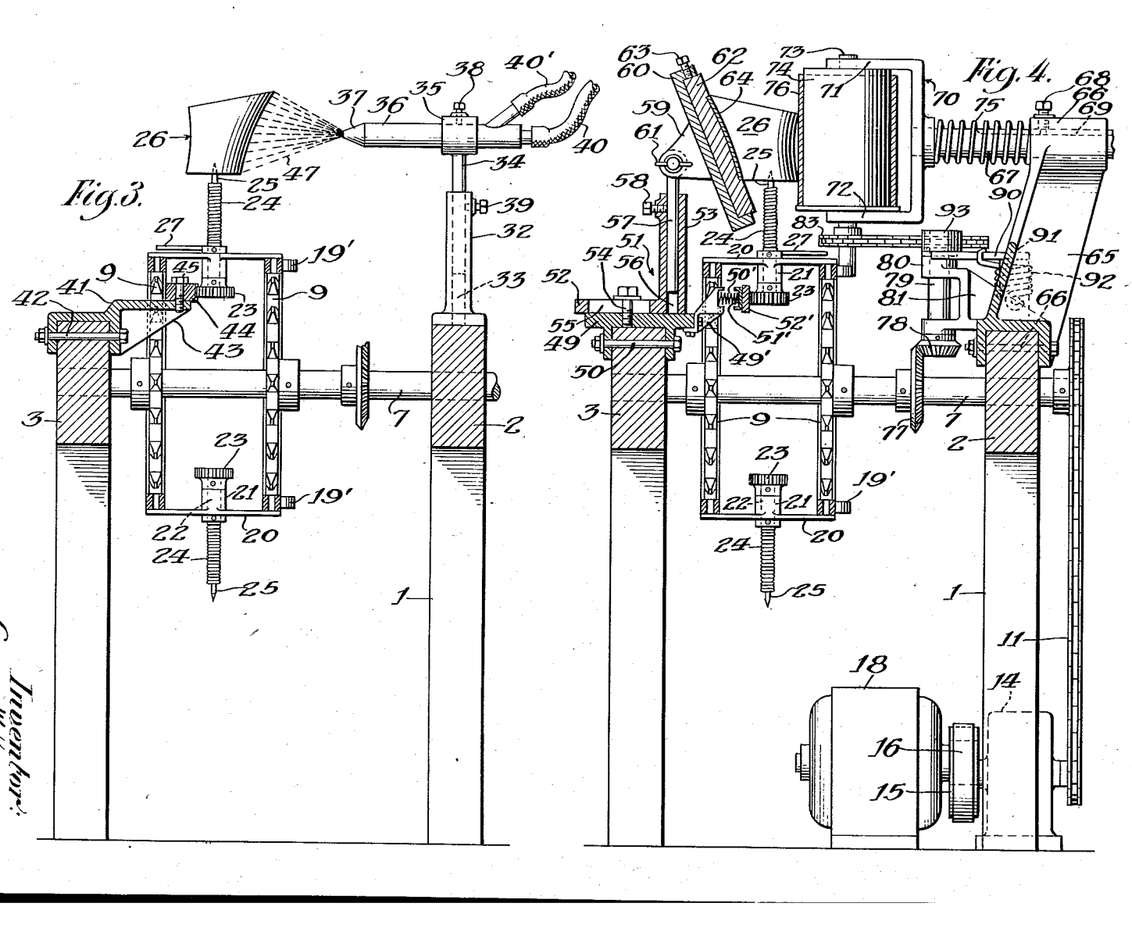
Fig. 3 is a transverse sectional view taken on line 3—3 of Fig. 1.
Fig. 4 is a transverse sectional view taken on line 4—4 of Fig. 1.

Referring particularly to Fig. 3 it will be seen that each bar 20 carries intermediate its length a bearing 21 in which a pin 22 is journalled, the axis of said pin extending at right angles to the length of the bar 20. At one end of the pin 22 a pinion 23 is keyed, and rigidly secured to the opposite end of said pin on the opposite side of bar 20 is a coil spring 24. The coils of the spring 24 are normally in contact with each other and the pitch of said coils is relatively small. At the opposite end of the spring 24 a sharpened pin 25 is mounted. During the operation of the machine in carrying out my process, the bottoms of the heels 26 to be coated are impaled upon the points of the pins 25.

When the motor 18 is set in operation, chains 19 travel continuously over sprocket wheels 8 and 9. Lug 27 is rigidly secured at one end to pin 22 and when the heels are impaled upon pins 25 they are placed thereon at a definite position with respect to the lug 27. This is accomplished as follows: Strips 28 and 28' are secured at their ends to the frame member 2 and extend substantially horizontally toward the opposite frame member 3. Similar strips 29 and 29' are secured at their ends to the frame member 3 and extend oppositely toward frame member 2. Adjacent the path of travel of chains 19, the strips 28, 28', 29 and 29' are bent upwardly to a point above the path of travel of chains 19 and are again bent to bring the free ends of the strips horizontally over the path of travel of the chains. The free ends of the strips 28 carry a guide bar 30 which is curved outwardly at one end. The free ends of strips 29 carry a similar guide bar 31 which is positioned oppositely from the guide bar 30. Similarly the free ends of strips 28' carry spaced guide bar 31'. The arrangement is such that as chains 19 travel in the direction indicated by the arrows in Figs. 1 and 2, lugs 27 contact the curved ends of the opposite guide bars 30 and 31 and in order to permit passage of the lugs forwardly, said lugs must be so moved as to dispose their longitudinal axes parallel to the length of the guide bars 30 and 31. While the lugs are so positioned, the heels are impaled upon the points of pins 25 and are impaled at a predetermined position with respect to the position of the lugs 27. Consequently, when said lugs are so moved as to be disposed with their axes parallel to the guide bars 30 and 31, the heels 26 will be carried forwardly in a predetermined position.

A standard or support 32 is mounted upon frame member 2 and is provided with an elongated central bore 33 which is adapted to receive a spindle 34. The spindle 34 carries a clamp 35 at its upper end which, in turn, is adapted to carry a spray gun 36 having a nozzle 37. The spray gun 36 is movable longitudinally within the clamp 35 and may be locked therein by means of bolt 38. The spindle 34 is movable vertically within the bore 33 and may be locked at a desired position by means of the set screw 39. The gun 36 is connected by means of flexible conduits 40 and 40' to respectively sources of coating liquid and air under pressure (not shown). The character of the coating material delivered by gun 36 will be hereinafter more fully described.

A bracket 41 may be secured by means of bolts 42 or the like to the frame member 3 directly opposite the gun 36. The bracket 41 is provided with an extension 43 which projects beneath the path of travel of one of the chains 19. A rack 44 is secured by means of screws 45 or the like to the extension 43, said rack being provided with a plurality of gear teeth 46. In operation, when chains 19 have moved a heel 26 and its supporting assembly to the vicinity of rack 44, the pinion 23 engages the teeth 46 upon said rack. Simultaneously a trigger (not shown) which is adapted to actuate the spray gun 36, is tripped by conventional means (not shown) carried by one of the chains 19 which causes a spray of coating material 47 to issue from nozzle 37. As the chains 19 move, the engagement of pinion 23 with the teeth 46 of rack 44 causes rotation of pin 21, spring 24 and, consequently, rotation of heel 26. The length of the rack 44 is so correlated with the diameter of the pinion 23 and the initial position of the heel 26, as lug 27 leaves the tracks 30 and 31, that the heel 26 is rotated within the volume of spray 47.

If desired, the spray gun 36 may be actuated by means (not shown) to swing the gun during the entire period of rotation of the heel, so that the spray will be trained on the heel during the entire period of its rotation.

When the heel leaves the vicinity of the rack 44 a trigger (not shown) is tripped by the movement of one of the chains 19 so as to shut off the spray. The coating fluid which I prefer to use comprises a cellulosic compound or mixture, the mixture comprising in general nitrocellulose, an active solvent, a diluent and a plasticizer. The characteristics of this material are such that when dry or set it forms a durable, attractive surface, and the proportions of the materials are so selected as to provide a fluid which may be readily dispersed from a spray gun and which will partially set before the graining operation takes place. Therefore, I do not wish to be limited to the exact proportions which are hereinafter set forth. In general, I have found that a mixture comprising 128 ounces of diluent, 128 ounces of active solvent, 2 pounds of nitrocellulose and 1 to 4 pounds of plasticizer provide a suitable mixture. As specific materials I have found that a composition comprising the following materials in the proportions given makes a suitable coating mixture:

| | Ounces |
|---|---|
| Amyl acetate | 16 |
| Denatured alcohol | 8 |
| Benzol or toluol | 48 |
| Ethyl acetate | 24 |
| Oleum recini (castor oil) | 32 |
| Nitrocellulose | 16 |

Desired pigment in suitable quantity to produce the desired color.

In the above set forth list alcohols may be substituted as diluents for benzol or toluol. In general, esters or ketones may be utilized as active solvents, for instance, butyl acetate, amyl acetate or "Cellusolve," being esters, may be used in place of ethyl acetate or among the ketones, acetone or ethyl methyl ketone may be substituted for the ethyl acetate. In place of castor oil as a plasticizer linseed oil, dibutyl pthalate or other well known plasticizing compounds may be used.

If desired, gums such as dammar, ester, synthetic resins may be added to the above materials in suitable proportions to increase the solid content of the mixture and produce a more flexible resulting film. Such gums may, if desired, be used along with proper diluents and/or solvents in place of the cellulosic mixture above suggested. However, in general the material sprayed upon the heel must be one which is capable of resulting in a relatively durable and attractive film and one over which the rate of drying or setting can be controlled so that the subsequent step of graining or embossing can be carried out while the film is in a suitable plastic condition.

If desired, the sprayed material may comprise a thermo-plastic material which may be permitted to completely set after spraying and before graining. In order to emboss such a film the heels may be passed through a preheating zone before graining whereby the film may be changed to the plastic state, and, if desired, the embossing die may be heated to perform the embossing operation without the application of excessive pressures. Of course, regardless of the material used to establish the film the embossing pressure will be dependent upon the hardness of the film during the embossing operation, as hereinafter described.

After leaving rack 44 the heel is carried forwardly by the chains 19 and again said heels are oriented by rails 30' and 31' which act upon lugs 27. In this manner the heels are carried forwardly to the embossing unit designated generally at 48. It can readily be seen, therefore, that the proportions of the materials sprayed upon the heel, particularly with reference to the diluents and solvents, must be correlated with the distance between the point of spraying and the embossing unit 48 taken in conjunction with the rate of travel of the chains 19 so that the film carried by the heel is in proper plastic condition to be acted upon in the embossing unit 48.

The embossing unit 48 comprises a bracket 49 which is secured to the frame member 3 by means of bolts 50. A standard 51 having a base portion 52 and an upwardly extending portion 53 is adjustably mounted upon bracket 49, the adjustable mounting comprising a set screw 54 which extends through slot 55 provided in the base member 52. By this provision the standard 51 may be adjustably disposed and locked at a desired position determined by the length of slot 55. The upright member 53 is provided with a central bore 56 in which a spindle 57 is adapted to be positioned. The spindle 57 is movable longitudinally within bore 56 and may be locked at a desired position vertically by a set screw 58. A lug 59 is pivotally secured to the upper end of the spindle 57, said lug being rigidly attached or formed integral with frame 60. By the provision of the pivotal mounting of frame 60 upon spindle 57, said frame may be moved to a desired angular position and may be locked in such position by means of a winged nut 61. The frame 60 is adapted to carry an embossing mold 62 which may be locked in said frame by means of set screw 63. The embossing mold 62 comprises a block having a portion 63' of its face provided with a surface contour which conforms with the exterior or coated surface of heel 26, that is, the development of such external surface excluding the breast of the heel.

During the embossing operation each heel 26 is rolled over the section 63' of the mold 62 and therefore the section 63' of the mold is formed with a surface contour which will register with the surface of the heel during the rolling operation. The face of the section 63' is adapted to contain a series of relatively minute projections or indentations which resemble in inverse relationship the grain marks of leather. To provide such surface the block 62 including the section 63' may be cast from metal as a unit, the indentations and projections being cast upon the surface of the section 63'. If desired the mold 62 may be so cast as to provide at the section 63' only the surface contour of the rolled heel and the embossing projections and indentations may be carried upon a strip 64 which may be adhesively or otherwise secured to the face of the section 63'. In this event the surface of the strip 64 serves as the embossing surface. The strip 64 may be constructed of leather, rubber, or any material which can be embossed to provide the desired projections and indentations and which may be shaped to conform with the surface contour of the section 63'. In the event this latter type of embossing surface is used, it is preferable that the strip 64 be backed with a layer or sheet of resilient material whereby compensation may be made for slight variations in the surface contours of heels which are presumably similar but which are actually slightly different in contour.

Opposite to the mold 62 a pair of standards 65 are secured to rail or frame member 2 by means of bolts 66 or the like. The upper end of each of the standards 65 is provided with a sleeve 66 in which a shaft or rod 67 is positioned. The shaft or rod 67 is slidably but non-rotatably positioned within the sleeve 66 and it may be prevented from rotating by the end of screw 68 which acts as a key by registering with the keyway 69 provided in the surface of shaft 67. At the outer end of each of the shafts 67 a U-shaped member 70 is rigidly carried, the arms 71 and 72 of said member serving as bearings for a shaft 73 upon which a pulley 74 is mounted. A coil spring 75 embraces shaft 67 between sleeve 66 and the member 70, the opposite ends of said coil spring bearing upon sleeve 66 and the member 70. As can readily be seen by reference to Figs. 2 and 4, the pulleys 74 are vertically positioned adjacent the path of travel of the heels 26. A belt 76 is trained around the spaced pulleys 74 and is provided with a relatively high friction surface.

A bevel gear 77 is keyed to shaft 7 and meshes with bevel pinion 78 carried by shaft 79. Shaft 79 is journalled in spaced bearings 80 which are formed integral with the bracket or support 81. A sprocket wheel 82 (Fig. 2) is mounted at the upper end of shaft 79 and is adapted to drive sprocket chain 83 which, in turn, is trained around sprocket wheel 84 carried upon the lower end of one of the shafts 73. In this manner one of the pulleys 74 is driven from shaft 7 and through the medium of belt 76 drives the other pulley 74. In practice the linear speed of belt 76 is equal to or slightly greater than the linear speed of the chains 19. The purpose of so driving belt 76 will be hereinafter more fully described.

Cams 19' are mounted upon the outer side of the chain 19 which travels adjacent the frame member 2, said cams being mounted slightly in advance of the cross members or bars 20, considered in the direction of travel of the chains. An extension (not shown) is provided upon the lower end of the first shaft 73 upon which the driven pulley 74 is mounted, said extension being positioned in the path of travel of cams 19'.

As chains 19 move forwardly carrying the coated heels toward unit 48, cams 19' contact the above mentioned extension of the shaft 73, and consequently the driven pulley 74 is moved backwardly away from the passing heel against the tension of the first spring 75. This permits the positioning of the heel between the belt 76 and die. After the heel has assumed this position cam 19' will have so moved as to permit the return of the driven pulley 74 to its normal position and, hence, the belt 76 will exert a lateral pressure upon the heel tending to move the same toward the die.

Figures 1, 2, 12:
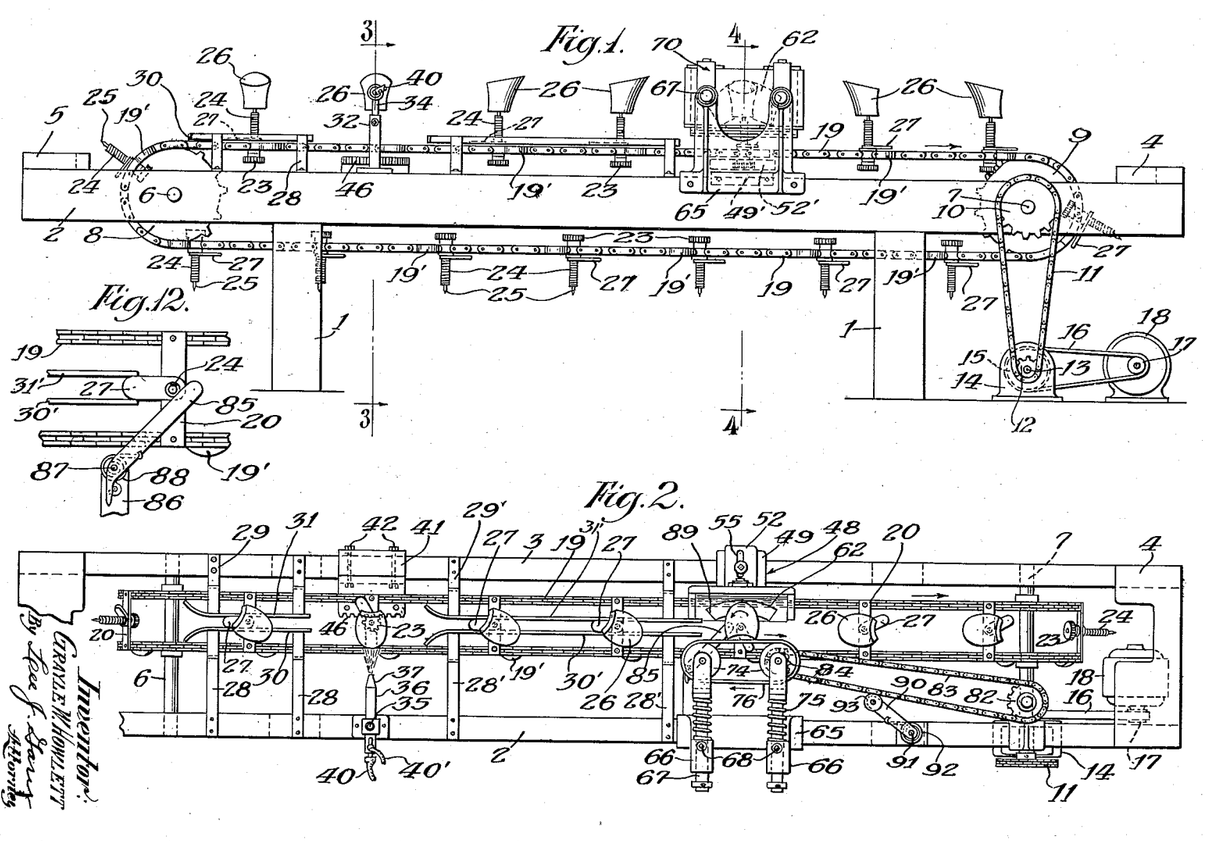
Fig. 1 is a diagrammatic side elevational view of the apparatus comprising my invention.
Fig. 2 is a top plan view of the apparatus illustrated in Fig. 1.
Fig. 12 is a detailed view of the device for tipping the heel prior to its contact with the mold or die.

An arm 85, Fig. 12, is pivotally connected to member 86 which, in turn, is mounted upon frame member 2. The pivotal connection comprises a pin 87 embracing which is a spring 88 anchored at one end to the member 86 and at the other end upon arm 85. The arrangement is such that spring 88 resists motion of arm 85 in a clockwise direction. The end of arm 85 extends in the path of travel of the upper portion of the coil spring 24. Consequently, as the chains 19 move forwardly the upper end of the coil spring 24 is contacted by the end of arm 85 just prior to the period when lug 27 leaves tracks 30' and 31'. This action tilts the spring 24 in a backwardly direction and also in a direction toward mold 62 until the adjacent corner of the heel engages the side 89 of the section 63'. At the period that this engagement takes place the end of lug 27 will have left tracks 30' and 31' and, hence, heel 26 will be free to rotate. Consequently, due to the motion of the belt 76 which resiliently presses said heel toward the section 63' of the mold 62, the heel is rotated so that its external surface rolls over the mold or die 64. Inasmuch as the coating or film upon the external surface of the heel 26 at this period is in a more or less plastic condition, the projections and indentations formed in the surface of the die 64 will impress or emboss said plastic film carried upon the heel whereby the grain marks characteristic of leather will be imparted to the plastic film. By driving the belt 76 at a slightly greater speed than chains 19, the possibility of slippage occurring between the external face of the heel and the section 64 is eliminated.

A support 49' is mounted upon the bracket 49, said support carrying a plurality of coil springs 50', one of which is shown in Fig. 4. A plate 51' is carried at the outer ends of the springs 50' and in turn carries a facing 52' which is constructed of leather, soft rubber, fabric or the like. The plate 51' and facing 52' are positioned beneath the die 62 and are so adjusted that the pinion 23 makes frictional contact with the facing 52'. In doing so a turning movement is imparted to the pinion which assists in the rotation of the heel over the die face. Of course, the relationship between the pinion and facing 52' is not a positive one and slippage therebetween is permitted, the only function being to assist in the turning of the heel.

Figure 5:
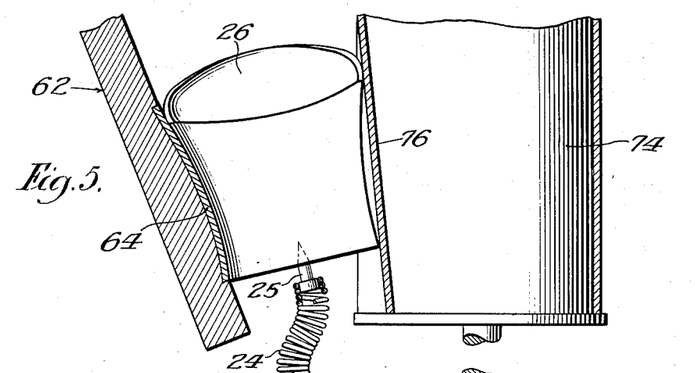
Figs. 5, 6 and 7 are a series of sectional views illustrating the rolling of the coated heel over the die or mold, said sections being taken upon lines 5—5, 6—6 and 7—7 of Fig. 8.
Figure 6:
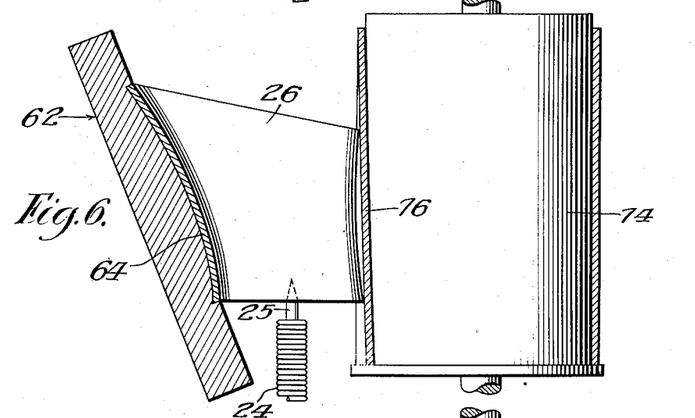
Figure 7:
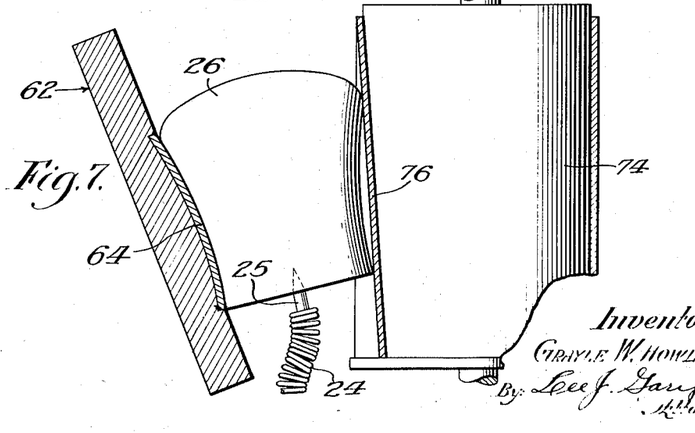
Figure 8:
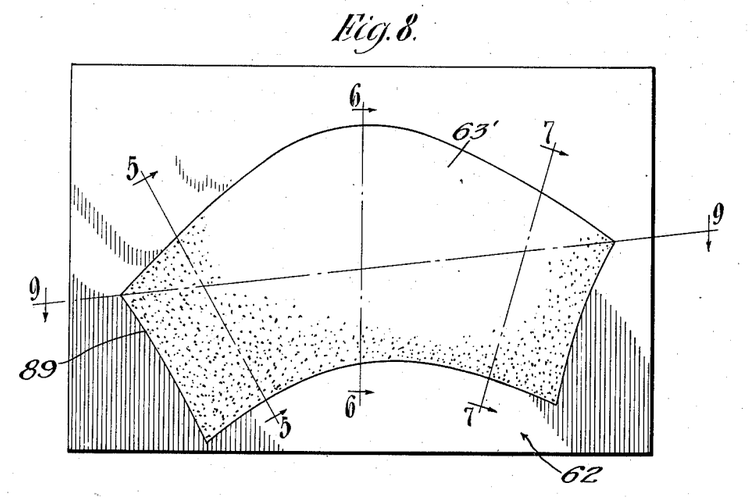
Fig. 8 is a face view of one form of mold or die.
Figure 9:
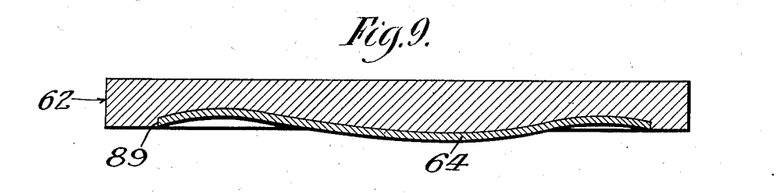
Fig. 9 is a sectional view taken on line 9—9 of Fig. 8.
Figure 10:
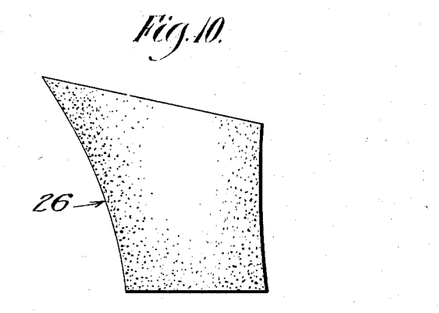
Fig. 10 is a side elevational view of a finished heel.
Figure 11:
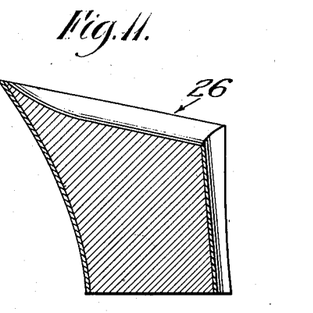
Fig. 11 is a sectional view taken through the heel shown in Fig. 10 illustrating particularly the coating thereof.

By referring to Figs. 5, 6 and 7 the position of the heel 26 between the belt 76 and mold 62 is illustrated, said views respectively showing the heel at its initial position between the belt and the mold, at its central position and also at its final position. The three positions illustrated are indicated upon the development or mold illustrated in Fig. 8. When the heel leaves the mold 62 the second pulley 74 is moved away from the mold by contact of the cam 19' with the extension of the driving shaft 73 thereby compressing the spring 75 associated with said pulley. Since this pulley constitutes the driving pulley, provision is made for maintaining chain 83 in taut condition and comprises an arm 90 pivotally connected at 91 to frame member 2. A spring 92 embraces the pivot in and is anchored at one end upon the pivot pin and at the other upon an intermediate portion of arm 90. A roller 93 is carried at the end of arm 90 and contacts chain 85. The heels 26 which pass from the embossing unit 48 are carried forwardly and may be subsequently removed from the pins 25, or said heels may be passed through a drying conduit in which warm air may be circulated. The drying conduit is not shown but may be of conventional construction. If desired the return path of travel of chains 19 may be enclosed and warm air may be circulated through the enclosed space thus formed. In this case the dried heels may be removed from the pins 25 just prior to the impalement of the uncoated heels.

To prevent the semi-plastic film carried upon the surface of the heel from adhering to the embossing surface 63, said surface may be periodically coated with a material resembling a masking paste or resist. These materials are common in their use for similar purposes with lacquers and I have found that the following mixture constitutes a suitable masking paste or resist for purposes of my invention.

| | Parts by weight |
|---|---|
| Glycerol | 20 |
| Starch | 20 |
| Pigment | 10 |
| Water | 50 |

It is to be understood, of course, that the above composition is set forth merely for purposes of illustration and is not intended to serve as a limitation of my invention.

In carrying out the process of my invention, the material initially sprayed upon the heels may be compounded to match the color and sheen of the other portions of the shoes which they are adapted to be used, or a finishing coat of lacquer enamel or other like material made to match the shoes in color may be sprayed or otherwise applied over the dried embossed film.

The die 62 instead of being cast, as hereinbefore described, may be pressed under relatively high pressure, and the embossing surface may be formed by a male pressing member (not shown).

Figure 13:
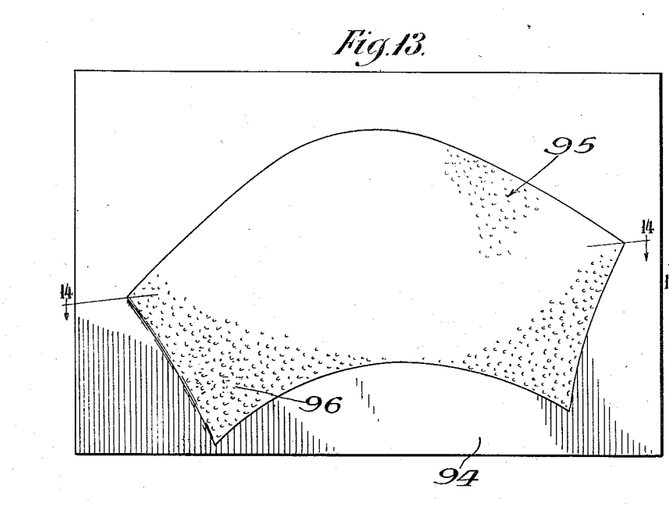
Fig. 13 is a face view of a modified form of embossing die.
Figures 14, 16, 17, 18:
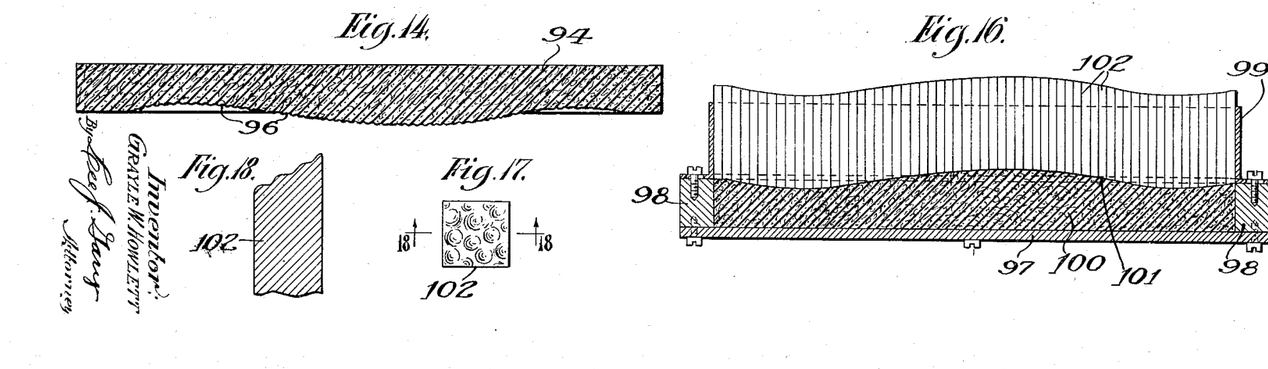
Fig. 14 is a sectional view taken on line 14—14 of Fig. 13.
Fig. 16 is a sectional view taken on line 16—16 of Fig. 15.
Fig. 17 is a top plan view of the upper end of one of the type bodies.
Fig. 18 is a sectional view taken on line 18—18 of Fig. 17.

Referring particularly to Figs. 13 and 14, a modified form of embossing die is shown, wherein 94 indicates a block of resilient material such as sponge rubber or relatively soft gum rubber. A portion 95 of the face of the block 94 is curved to conform with the contour of a heel, and the surface thereof may be grained, as indicated at 96 in Fig. 13, to provide an embossing surface. In view of the fact that the block 94 is relatively resilient it is not essential that the surface of area 95 be curved to conform exactly with the contour of a heel, an approximate conformation being all that is necessary. In addition, the area 95 may be larger than the development of the heel, which eliminates the necessity of exactly registering a predetermined portion of the heel with a predetermined portion of the embossing face prior to the rolling operation.

To obtain a more clearly demarked embossing surface, and produce a surface with greater wear resistance, I treat the grained surface 95 with chlorine or the like to harden the embossing surface without affecting the resilience of the block itself, that is, the grained surface is "case hardened."

Referring to Figs. 15, 16, 17 and 18, another modified form of embossing die is illustrated. In this type of die 97 indicates a backing plate to which is secured lateral walls 98. Flanges 99 are secured to the top of the lateral walls and extend upwardly therefrom. A resilient block 100 is adapted to be positioned within the walls 98, said block preferably comprising relatively resilient gum rubber or the like. The upper surface of the block is preferably curved, as indicated at 101 in Fig. 16, to conform approximately to the developed surface of a heel. The flanges 99 provide a form in which a mass of type bodies 102 are positioned, said bodies being relatively elongated and being disposed side by side so as to completely fill the entire area defined by the flanges 99. The bottom ends rest upon the curved surface of the block 100, and being of substantially equal length the upper ends of said type bodies provide a curved surface which conforms with the curved face of the block 100. In view of the fact that the surface created by the upper ends of the type bodies is curved, it is desirable that the upper ends of the type bodies 102 be so tapered or otherwise formed as to approximately conform to the curved surface. The upper surface of each type body is provided with appropriate indentations and projections, as shown at 103 in Fig. 17, as to simulate the grain marks of leather.

Either block 94 or the assembly comprising block 100 and type bodies 102 may be utilized in place of the embossing die 62. In either case the embossing die will comprise a relatively yielding embossing surface which is capable of producing clean cut grain marks. By approximating the surface contours of the face 95 and the face 101 with the developed surface of a heel, the embossing pressure over substantially the entire surface of the heel will be substantially uniform which is obviously of advantage.

Figure 15:
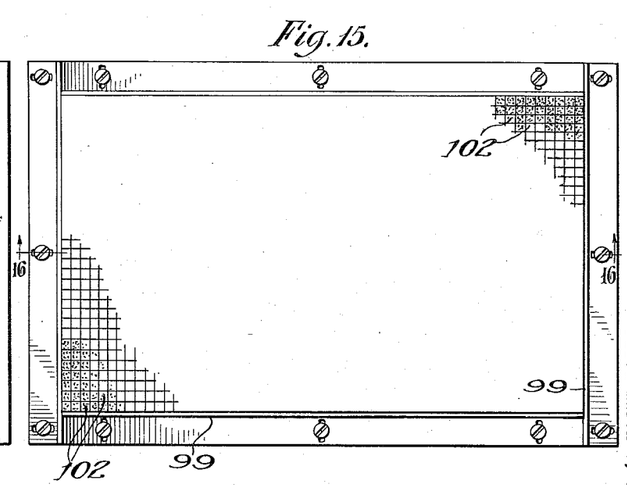
Fig. 15 is a face view of another modified form of embossing die.

If desired the type assembly shown in Figs. 15 and 16 may carry type (not shown) having faces so arranged as to print a picture of ornamental design upon the surface of an irregular body such as a heel. In case of this use it may be desirable to pass a heel forwardly, as herein described without spraying the same and thereafter printing upon the surface of the heel by rolling the same over a previously inked surface of type bodies.

In order to facilitate the handling of the type 102 the lower ends of the type bodies may all be joined together by a relatively thin film of rubber latex or rubber cement, the film being sufficiently thin and resilient as to permit a limited degree of independent longitudinal movement of the individual type bodies.

By the expression "external lateral surface" as used in the specification and claims with reference to the heels is meant, the surface of the heel excluding the top, bottom and breast portion.

One of the decided advantages of decoratively covered heels as made according to my invention resides in the fact that the covering film is caused to set in conformation with the surface contour of the heel. Although the cover may or may not qualitatively or chemically differ from a cover which is applied as a previously set flat sheet, physically there is a decided difference in that the cover during application has not been deformed and, consequently, the heel does not possess the stresses of tension and compression which are existent at all times in the cover which must be bent to be applied to the heel surface.

I claim as my invention:

1. A device for applying decorative coverings to heels which comprises in combination means for carrying heels forwardly in seriatim, means disposed adjacent said heel carrying means for applying a potentially hardenable film in fluid condition upon said heels, and means disposed adjacent the heel carrying means for embossing the films upon said heels.

2. A device for applying decorative coverings to heels which comprises in combination an endlessly moving conveyor for carrying heels forwardly in seriatim, means disposed adjacent said conveyor for spraying a potentially hardenable film in fluid condition upon said heels, and means disposed adjacent said endless conveyor for embossing the films upon said heels.

3. A device for applying decorative coverings to heels which comprises in combination an endlessly moving conveyor for carrying heels forwardly in seriatim, means disposed adjacent said conveyor for spraying a potentially hardenable film in fluid condition upon said heels, and an embossing die disposed adjacent said endless conveyor for embossing the films upon said heels.

4. A device for applying decorative coverings to heels which comprises in combination an endlessly moving conveyor, rotatable means mounted in spaced relationship upon said conveyor for carrying heels forwardly in seriatim, means disposed adjacent said conveyor for rotating said heel carrying means, means mounted adjacent said conveyor for spraying said heels with a potentially hardenable film while said heels are rotated, and means disposed adjacent said conveyor for embossing the films upon said heels.

5. A device for applying decorative coverings to heels which comprises in combination an endlessly moving conveyor, rotatable means mounted in spaced relationship upon said conveyor for carrying heels forwardly in seriatim, means disposed adjacent said conveyor for rotating said heel carrying means, means mounted adjacent said conveyor for spraying said heels with a potentially hardenable film while said heels are rotated, and an embossing die disposed adjacent said endless conveyor, means for bringing said heels into contact with said die in seriatim, said means causing said heels to roll over the surface of the die to emboss the film thereon.

6. A device for applying decorative coverings to heels which comprises in combination an endlessly moving conveyor, rotatable means mounted in spaced relationship upon said conveyor for carrying heels forwardly in seratim, means mounted adjacent said conveyor for coating said heels with a potentially hardenable film while said heels are carried forwardly, an embossing die disposed adjacent said endless conveyor into contact with which said heels pass, and means for rotating said heels when said heels contact said embossing die to roll said heels over said die and emboss the films upon the surface of the heels.

7. A device for applying decorative coverings to heels which comprises in combination an endlessly moving conveyor, rotatable means mounted in spaced relationship upon said conveyor for carrying heels forwardly in seriatim, means mounted adjacent said conveyor for coating said heels with a potentially hardenable film while said heels are carried forwardly, an embossing die disposed adjacent said endless conveyor into contact with which said heels pass, means for rotating said heels when said heels contact said embossing die to roll said heels over said die and emboss the films upon the surface of the heels, and means disposed adjacent said conveyor for maintaining said heels in film-embossing contact with said die during the rolling of said heels.

8. A device for applying decorative coverings to heels which comprises in combination an endlessly moving conveyor for carrying heels forwardly in seriatim, means disposed adjacent said conveyor for applying a potentially hardenable film in liquid condition upon said heels, and a resilient embossing die disposed adjacent said endless conveyor for embossing the films upon said heels.

9. A device for applying decorative coverings to heels which comprises in combination an endlessly moving conveyor for carrying heels forwardly in seriatim, means disposed adjacent said conveyor for applying a potentially hardenable film in liquid condition upon said heels, and an embossing die disposed adjacent said endless conveyor for embossing the film upon said heels, said embossing die having a relatively hard embossing surface and a resilient backing.

10. A device for applying decorative coverings to heels which comprises in combination an endlessly moving conveyor for carrying heels forwardly in seratim, means disposed adjacent said conveyor for applying a potentially hardenable film in liquid condition upon said heels, and an embossing die disposed adjacent said endless conveyor for embossing the film upon said heels, said embossing die comprising a casing, a resilient block carried by said casing, and a plurality of type bodies movably positioned relative to each other carried on said resilient block, said type bodies comprising the embossing surface.

11. A device for applying decorative coverings to heels which comprises in combination an endlessly moving conveyor for carrying heels forwardly in seriatim, a resilient impression member disposed adjacent the path of travel of said endless conveyor, said impression member comprising a casing, a resilient block carried by said casing, a plurality of type bodies movably positioned relatively to each other carried on said resilient block, said type bodies comprising a printing surface, and means for rolling each heel in seriatim over said printing surface to decorate the surfaces of said heels.

GRAYLE W. HOWLETT.